United States Patent [19]

Giordano et al.

[11] 3,827,764

[45] Aug. 6, 1974

[54] COMBINED BRAKING AND TRIM-CORRECTION DEVICES FOR ROAD VEHICLES

[75] Inventors: Jean-Louis Giordano; Michel Lietard, both of Billancourt, France

[73] Assignee: Regie Nationale des Usines Renault, Billancourt; Automobiles Peugot, Paris, both of France

[22] Filed: Feb. 5, 1973

[21] Appl. No.: 329,470

[30] Foreign Application Priority Data

Feb. 10, 1972 France........................72.04487

[52] U.S. Cl................................ 303/22 R, 188/195
[51] Int. Cl................................................ B60t 8/18
[58] Field of Search............... 303/22, 23, 6 R, 6 C; 188/195, 3; 280/124

[56] References Cited
UNITED STATES PATENTS

| | | | |
|---|---|---|---|
| 3,410,612 | 11/1968 | Lepelletier | 303/22 A |
| 3,475,059 | 10/1969 | Klein | 188/195 |
| 3,504,949 | 4/1970 | Serpette | 303/22 R |

FOREIGN PATENTS OR APPLICATIONS

| | | | |
|---|---|---|---|
| 1,196,483 | 6/1970 | Great Britain | 188/195 |

*Primary Examiner*—Duane A. Reger
*Assistant Examiner*—D. C. Butler
*Attorney, Agent, or Firm*—Stevens, Davis, Miller & Mosher

[57] ABSTRACT

The invention relates to the limiting of braking pressure on a road vehicle comprising a trim-correction device connected in parallel with the suspension springs and intended to compensate for the variations in the load on the vehicle. As, with a trim-correction device, the distance between the wheels and the body remains constant irrespective of the load carried, the invention utilizes as the parameter indicating the excess load on the vehicle, the over-pressure which then exists in the jacks of the trim-correction device. The braking correction device comprises a pressure-limiting valve controlled by a member responsive to the fluid pressure in the jack cylinders.

4 Claims, 3 Drawing Figures

COMBINED BRAKING AND TRIM-CORRECTION DEVICES FOR ROAD VEHICLES

The present invention relates to the limiting of braking pressure on a vehicle which comprises a trim-correction device mounted in parallel with the suspension springs, and intended to compensate for the variations of the load on the vehicle.

Braking pressure limiters are already known in which the transmission of the braking pressure in the hydraulic circuit of the rear brakes is interrupted above a certain value, which is a function of the load which is carried by the rear wheels. In this case, use is made of the variation in the distance between the rear train of wheels, a non-suspended element, and the vehicle body which is a suspended element, the value being affected by modifications of load on the vehicle.

However, in the case where a vehicle is provided with a trim-correction device, the distance between the rear wheels and the body remains constant irrespective of the static load carried, so that this distance can no longer be taken as a characteristic of the overload in acting on the braking limiter.

The present invention provides a solution to this problem, according to which there is utilized as the overload indicator parameter of the vehicle, the excess pressure which then exists in the jacks of the trim-correction device.

Essentially, according to the invention, combined braking and trim correction devices for road vehicles, in which the trim corrector comprises receiving members for fluid under pressure, mounted in parallel to the suspension springs of the vehicle, and the braking correction device comprises a pressure-limiting valve, this latter being subjected to the action of a member responsive to the fluid pressure in the receiving members, are characterized in that there are arranged between the receiving members and the responsive device, isolating means of this latter which interrupt all communication with the receiving devices outside the active phases of the trim-correction device.

The invention is described below diagrammatically by way of example, reference being made to the accompanying drawings, in which.

Figure 2:
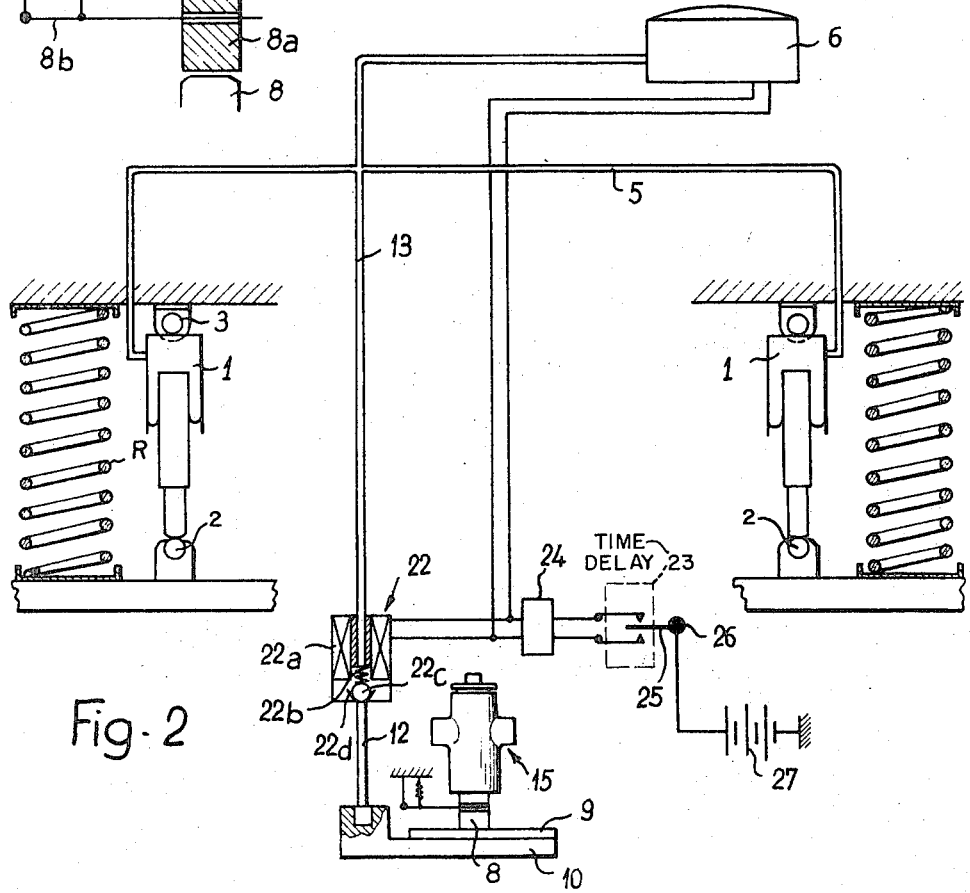
FIG. 2 is a general view of the associated trim and braking correction devices.

FIG. 2 is a partial view of pneumatic trim correction device similar to that which has already been described in French Pat. application No. 71/07435 of the present applicants. Mounted in parallel with the suspension springs R, and intended to compensate for the variations of the load on the vehicle, is the trim-correction device which comprises the pneumatic jacks 1 which are coupled at their lower portions at 2 to the wheels of the vehicle, and at their upper portions at 3 to the vehicle body.

The chambers of the jacks 1 communicate by means of conduits 5 and 13 with a fluid-tight chamber 6 forming a reservoir for fluid under perssure and containing a motor-compressor set.

Figure 1:
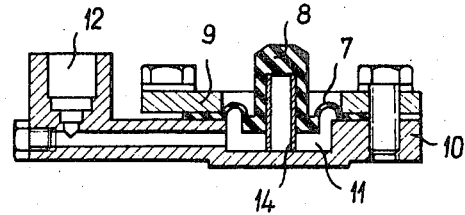
FIG. 1 is a view in cross-section of the device which is responsive to the excess pressure existing in the jacks of the trim-correction device.

FIG. 1 shows a pneumatic piston responsive to the excess pressure of the pneumatic jacks and acting on the pressure-limiting device. It is essentially constituted by a slightly deformable moulded diaphragm 7 having at its upper portion a finger 8, and gripped between two parts 9 and 10 of a casing.

Figure 3:
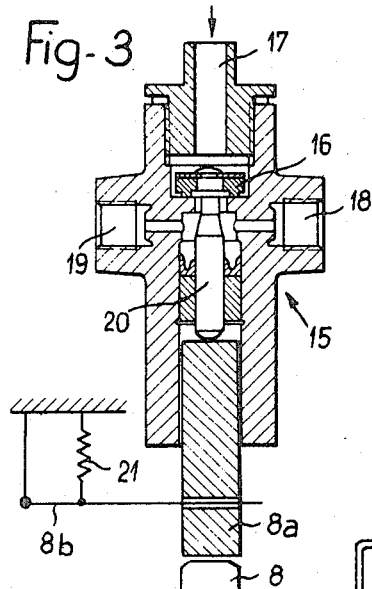
FIG. 3 is a view in cross-section of a braking limiter which can be employed in the device.

The chamber 11 thus formed in the casing is connected by a pipe 12 to a conduit 13 (see FIG. 2) subjected to the pressure existing in the jacks 1, which thus reaches the lower face of the diaphragm 7. A spring 14 holds the diaphragm 7 and its finger 8 in position. This finger 8 co-operates with a pressure-limiter which may be of any type known per se and of which one known form of construction is shown in detail in FIG. 3, this limiter being indicated as a whole by the reference 15.

The pressure-limiter comprises a clapper-valve 16 for interrupting the braking circuit, mounted between a supply conduit 17 coupled to the braking-pressure source and the conduits 18 and 19 connected to the brakes of the rear-wheel train. The clapper-valve 16 is rigidly fixed to a piston 20 subjected to the braking pressure in the circuit of the rear brakes.

Within the framework of the invention, the mobile assembly of the clapper-valve-piston 16 – 20 is furthermore subjected to the action of the finger 8 of the moulded diaphragm 7, either directly or preferably indirectly through the intermediary of a push-rod 8a, and subjected to the action of a lever 8b articulated on the vehicle body and of a spring 21 interposed between the body and the lever and maintaining a certain constant minimum pressure on the clapper 16 in order to obtain a pre-determined correct calibration of the pressure-limiter when the vehicle is empty and when a slight pressure exists in consequence in the jacks, this pressure being likely to be still further reduced under rebound conditions.

It will be observed that the clapper 16 is intentionally shown in operation, that is to say in the interruption position. However, in order that the setting of the pressure-limiter may be independent of the dynamic load variations, for example during the course of braking or acceleration, there are preferably provided in this case, isolating means for the pressure existing in the chamber 11 in order that it may really correspond to the static load on the vehicle.

These means are composed for example of an electro-valve 22 which completely isolates the chamber 11 from the conduit 13 as long as no other correction of the trim of the vehicle is effected.

The upper portion of the casing of the electro-valve 22 is occupied by an electro-magnet 22a, at the center of which the conduit 13 opens. Against the edges of the lower opening of the electro-magnet is supported a spring 22b which forces a ball 22c against its seating 22d, to which the conduit 12 is connected.

The spring 22b must be powerful enough to maintain the ball 22c in the closed position when the electro-magnet is not excited, and also during a variation of dynamic load, espcially under conditions of rebound (the wheels moving away from the body) and when only a low pressure exists in the jacks. In this case, in fact, it may happen that the pressure existing in the chamber 12 becomes greater than that of the jacks and that the spring 22b, if it were too weak, would permit a transfer of gas out of the chamber 11 which it is desired to keep isolated from the jacks.

In addition, the electro-valve may be servocontrolled by a detection device 23 with a time-lag control 24 of the height of the body, such as described for example in U.S. Pat. No. 3,704,895 of Dec. 5, 1972 and No. 3,589,700 of June 29, 1971.

The detector shown diagrammatically in this case comprises a member with a moving electric contact 25 which is fixed in the center of an anti-inclination rod 26 for example, and which is electrically connected to the current supply source 27. It co-operates by means of fixed contacts with the time-delay device 24 ensuring the time-delay control of the motor compressor of the chamber 6 and of the electro-valve 22 of which it controls the opening. This time-delay device may be of the thermal, electric or electronic type.

Thus, when the detection and control device closes the electric circuit permitting the motor compressor set to be started-up in order to reestablish the trim of the vehicle, the electric shunt terminating at the electro-valve 22 permits its opening and in consequence the equalization of the pressure in the chamber 11 with its new value in the jacks.

When the trim correction is completed and therefore when the above electric circuit is opened, the electro-valve closes and completely isolates the chamber 11 from the pneumatic jacks, and also from all their variations in pressure due to temporary oscillations, as previously indicated.

In operation, when a static overload is applied to the rear train of the vehicle, the increase in pressure which results in the jacks 1 after the corresponding correction of the trim is passed through 5, 13, 22 and 12 into the chamber 11 arranged at the lower face of the pneumatic piston. In doing this, the finger 8 rises and increases the resistive force on the piston of the limiter, which modifies the load of the piston 20 acting on the opening of the clapper-valve 16, as a function of the increase of pressure in the jacks. For this reason, the operation of the pressure-limiting device will take action on the braking for a value of the pressure in the conduits 18 and 19 terminating at the rear brakes, which will be higher than before.

On the other hand, when the static load carried by the rear train of the vehicle is reduced, after correction of the trim, a new pressure, lower than the previous pressure, is applied in the chamber 11. Contrary to the preceding case, the finger 8 moves slightly downwards and by this means partly liberates the pressure-limiting clapper-valve 18 from its load, so that its closure is effected for the braking at a value lower than the pressure in the conduits which terminate at the rear brakes.

What we claim is:

1. Combined braking and trim-correction devices for road vehicles having suspension springs, in which said trim-correction device operates periodically and comprises a plurality of members coupled in parallel with the suspension springs of said vehicle and adapted to receive fluid under pressure, said braking-correction device comprising a pressure-limiting clapper-valve, said valve being subjected to the action of a means responsive to the pressure of the fluid in said receiving members for applying a force on said valve, and further comprising means disposed between said receiving members and said responsive means for isolating said responsive member and interrupting all communication with said receiving members outside the periods of operation of said trim-correction device.

2. Combined braking and trim-correction devices as claimed in claim 1, and further comprising a device for detecting the height of said vehicle body, said detecting device having a time-delay control for the trim correction and being adapted to control said isolating means.

3. Combined braking and trim-correction devices as claimed in claim 1, in which said pressure-limiting clapper-valve is subjected to the action of a spring applied in the same direction as the force of said responsive means and adapted to maintain a pre-determined minimum force on said valve.

4. Combined braking and trim correction devices as claimed in claim 1, in which said responsive means is a diaphragm piston comprising a finger for applying the force on said pressure-limiting clapper-valve.

* * * * *